US011075757B2

(12) United States Patent
Schiatti et al.

(10) Patent No.: US 11,075,757 B2
(45) Date of Patent: Jul. 27, 2021

(54) SHIELDED INTEROPERABILITY OF DISTRIBUTED LEDGERS

(71) Applicant: Accenture Global Solutions Limited, Dublin (IE)

(72) Inventors: Luca Schiatti, Juan-les-Pins (FR); Antoine Rabenandrasana, Nice (FR); Hugo Borne-Pons, Juan-les-Pins (FR); Giuseppe Giordano, Juan-les-Pins (FR)

(73) Assignee: Accenture Global Solutions Limited, Dublin (IE)

( * ) Notice: Subject to any disclaimer, the term of this patent is extended or adjusted under 35 U.S.C. 154(b) by 101 days.

(21) Appl. No.: 16/383,066

(22) Filed: Apr. 12, 2019

(65) Prior Publication Data

US 2020/0099524 A1 Mar. 26, 2020

Related U.S. Application Data

(63) Continuation of application No. 16/142,657, filed on Sep. 26, 2018, now Pat. No. 10,298,395.

(51) Int. Cl.
*H04L 9/32* (2006.01)
(52) U.S. Cl.
CPC .......... *H04L 9/3221* (2013.01); *H04L 9/3239* (2013.01); *H04L 2209/38* (2013.01)
(58) Field of Classification Search
CPC . H04L 9/3221; H04L 9/3239; H04L 2209/38; H04L 9/3218
See application file for complete search history.

(56) References Cited

U.S. PATENT DOCUMENTS

| | | | | |
|---|---|---|---|---|
| 9,584,493 | B1* | 2/2017 | Leavy | H04L 9/0894 |
| 2018/0077122 | A1* | 3/2018 | Hoss | H04L 63/0407 |
| 2018/0117446 | A1* | 5/2018 | Tran | H04L 9/3236 |
| 2018/0285217 | A1* | 10/2018 | Smith | G06F 21/00 |
| 2018/0300741 | A1* | 10/2018 | Leonard | G06Q 30/08 |
| 2018/0315026 | A1* | 11/2018 | Kraemer | G06Q 20/145 |
| 2019/0318425 | A1* | 10/2019 | Tilley | G07F 15/00 |

(Continued)

OTHER PUBLICATIONS

Gabizon (NPL, "How Transactions Between Shielded Addresses Work", Zcash Company blog (Year: 2016) (Year: 2016).*

(Continued)

*Primary Examiner* — Meng Li
(74) *Attorney, Agent, or Firm* — Brinks Gilson & Lione

(57) ABSTRACT

A system may receive a request to perform a token exchange between a first account and a second account. A selected token for the token exchange may be associated with the first account. A hash of the selected token may be stored on a furnisher blockchain of a first distributed ledger. The system may generate a new token and a hash of the new token. The system may generate a shielded exchange instruction, the shielded exchange instruction comprising the hash of the new token and a zero-knowledge proof, wherein the zero-knowledge proof is indicative of the selected token being associated with the first account. The system may submit the shielded exchange instruction to a distributed ledger technology platform to cause execution of a furnisher smart contract and a receiver smart contract. Each of the smart contracts are configured to separately verify the zero-knowledge proof and update corresponding blockchains to consummate and record the token exchange.

20 Claims, 7 Drawing Sheets

(56) References Cited

U.S. PATENT DOCUMENTS

2019/0385157 A1* 12/2019 Mallela .............. G06Q 20/3678
2020/0059364 A1*  2/2020 Konda .................... G06F 21/74

OTHER PUBLICATIONS

Extended European Search Report, issued in European Application No. 19175561.0, dated Dec. 3, 2019, pp. 1-4, European Patent Office, Munich, Germany.
Alexei Zamyatin et al., "Xclaim: Trustless, Interoperable, Cryptocurrency-Backed Assets," DOI: 10.1109/SP.2019.00085, 2019 IEEE Symposium on Security and Privacy (SP), dated Sep. 16, 2019, pp. 1-18, published online by IEEE at URL https://doi.org/10.1109/SP.2019.00085, San Francisco, CA.
Killian Davitt et al., "Zcash & Zerocash: Data mining, cryptanalysis and key reuse," dated Mar. 25, 2018, pp. 1-11, published online by Killian Davitt at URL https://killiandavitt.me/zcash_explanation_data_mining_and_analysis.pdf.
Hartwig Mayer, "zk-SNARK explained: Basic Principles," dated Dec. 13, 2016, pp. 1-8, DOI: 10.13140/RG.2.2.20887.68007, published online by ResearchGate at URL https://www.researchgate.net/publication/321124635_zk-SNARK_explained_Basic_Principles.
"Quorum—ZSL Integration: Proof of Concept: Technical Design Document," dated 2017, pp. 1-23, published online by GitHub, Inc. at URL https://github.com/jpmorganchase/zsl-g.
Ariel Gabizon, "How Transactions Between Shielded Addresses Work," Zcash Blog, dated Nov. 29, 2016, pp. 1-5, published online by ZeroCoin Electric Coin Company at URL https://blog.z.cash/zcash-private-transactions/.
Adam Luciano, "ZK-SNARKS—A Realistic Zero-Knowledge Example and Deep Dive," Verif-y, dated Jun. 8, 2018, pp. 1-14, published online by Verif-y at URL https://verif-y.com/blog-zksnark-deep-dive/.
Christian Lundkvist "Introduction to zk-SNARKS with Examples," ConsenSys Media, dated Mar. 27, 2017, pp. 1-10, published online by ConsenSys Media at URL https://media.consensys.net/introduction-to-zksnarks-with-examples-3283b554fc3b.
Gideon Greenspan, "Understanding Zero Knowledge Blockchains," Private Blockchains, dated Nov. 3, 2016, pp. 1-9, published online by MultiChain at URL https://www.multichain.com/blog/2016/11/understanding-zero-knowledge-blockchains/.
Wahyue, "What is zkSNARKS: Spooky Moon Math," Cryptocurrency, dated 2017, pp. 1-20, published online by Steemit at URL https://steemit.com/cryptocurrency/@wahyue/what-is-zksnarks-spooky-moon-math.
Mirko Boehm, "The Emerging Blockchain Innovation Landscape," dated Oct. 22, 2018, pp. 1-26, published by Open Invention Network, Durham, NC.
Jon Wright et al., "Blockchain Innovation," dated Oct. 19, 2018, pp. 1-4, published by Sterne Kessler, Washington, D.C.
Koen Lievens, "Examining Blockchain Inventions," dated Oct. 22, 2018, pp. 1-7, published by the European Patent Office, Munich, Germany.
Richard Bennett, "Scoping Roundtable for Blockchain," dated Oct. 22, 2018, pp. 1-2, published by the European Patent Office, Munich, Germany.
"Blockchain," dated Oct. 2018, pp. 1-12, published by Deutsche Bank AG, Frankfurt, Germany.

* cited by examiner

SHIELDED INTEROPERABILITY OF DISTRIBUTED LEDGERS

TECHNICAL FIELD

This application is a continuation of U.S. application Ser. No. 16/142,657 filed Sep. 26, 2018, the entirety of which is hereby incorporated by reference.

BACKGROUND

A distributed ledger may include a consensus of replicated and synchronized digital data across multiple nodes. Participants of a distributed ledger may apply an agreed upon protocol for, verifying, storing, and maintaining, and modifying information stored in the distributed ledger. In many examples, a distributed ledger may be implemented by way of one or more blockchains implemented in a peer-to-peer network. The unique protocol, technologies, and other design considerations of a particular distributed ledger may inhibit cohesive sharing, synchronization, and/or transferring of information with other distributed ledgers.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
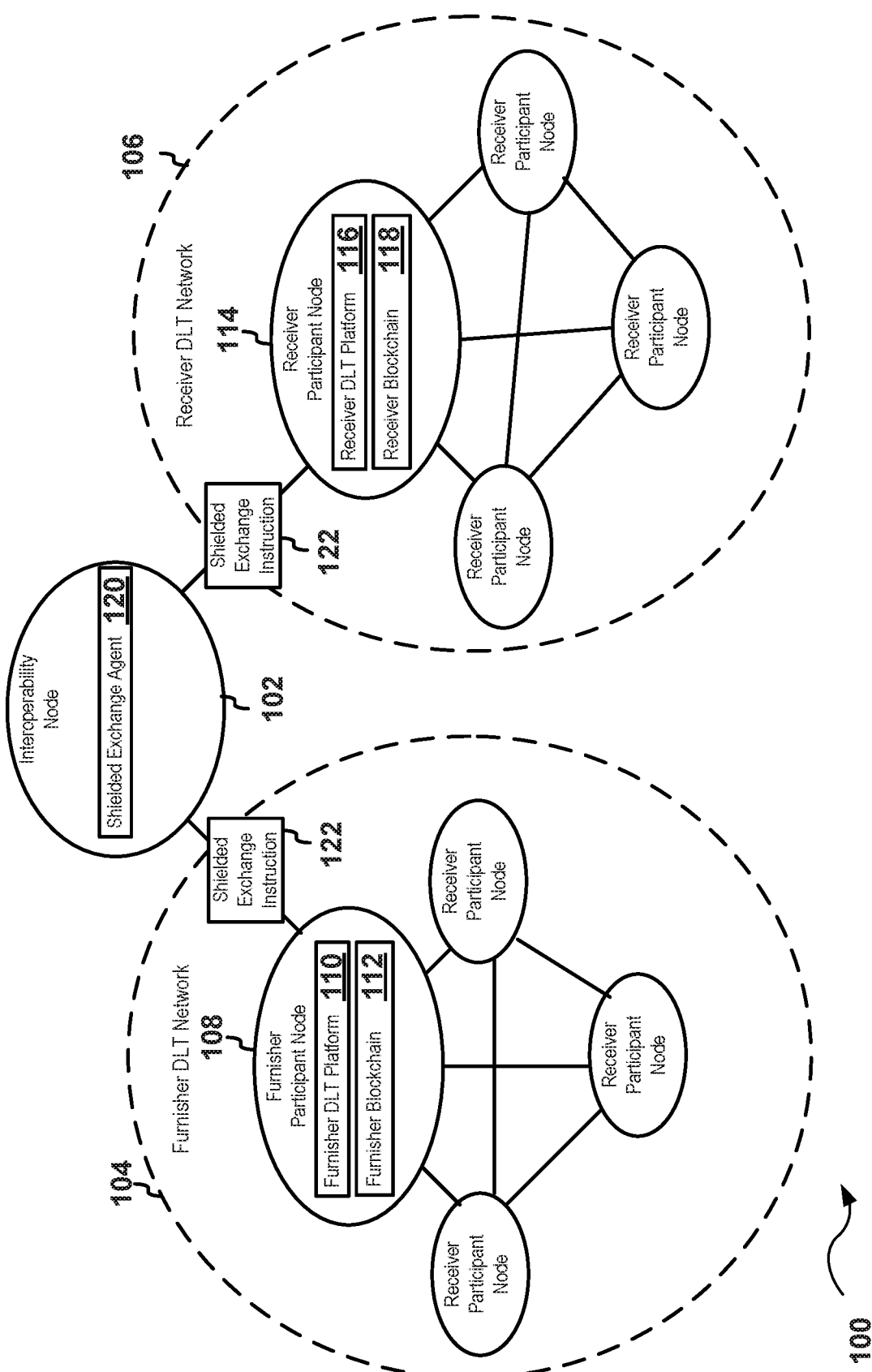
FIG. 1 illustrates a first example of a system for shielded interoperability between distributed ledger technology networks.

A distributed ledger technology (DLT) may apply an agreed upon protocol for interaction with a blockchain. The unique protocol, technologies, and other design considerations of a particular distributed ledger may inhibit cohesive sharing, synchronization, and/or transferring of information with other distributed ledgers and/or non-participants. In some circumstances, distributed ledger technology may shield tokens from their recorded history on a blockchain. In such systems, a blockchain may record the exchange of tokens between parties while maintaining the confidentiality of the parties involved and the token amounts transferred. Cryptographic hashing further complicates cohesive token exchanges between independent distribute ledger platforms because the underlying data being exchanged is obscured.

Accordingly, there is disclosed digital systems and methods for shielded interoperation between DLT networks. By way of an introductory example, the system may include an interoperability node in communication with a furnisher participant node of a furnisher DLT network and a receiver participant node of a receiver DLT network. A furnisher smart contract may be stored on a furnisher blockchain for the furnisher DLT network. A receiver smart contract may be stored on a receiver blockchain for the receiver DLT network.

The interoperability node may obtain a shielded exchange instruction. The shielded exchange instruction may include a zero-knowledge proof, a selected token nullifier, a new token nullifier, and a new token digest. The selected token nullifier may include a hash of a selected token identifier. The new token nullifier may include a hash of a new token identifier. The new token digest may include a hash of at least a recipient public key of the receiver participant node and a new token identifier. The zero-knowledge proof may be indicative of the furnisher participant having access to the selected token identifier.

When the interoperability node determines that the new token nullifier is not present on the receiver blockchain, the interoperability node may submit the shielded exchange instruction to the furnisher smart contract and the receiver smart contract. The furnisher smart contract may retire the selected token nullifier on the furnisher blockchain. The receiver smart contract may insert the new token nullifier and the new token digest to the receiver blockchain.

One example of a technical advancement achieved by the systems and methods described below may be that an interoperability node may facilitate private token exchange between two or more independent and otherwise incompatible DLT networks. For example, the interoperability node may initiate and perform a private token exchange between independent DLT networks without requiring access to the identification of the parties involved and/or the identities or values of the underlying tokens. For example, the interoperability node may receive a shielded exchange instruction that include hashed values of tokens that obscure the identities of the parties and details of the tokens.

Alternatively or in addition, another example of a technical advancement achieved by the systems and method described below may be that a zero-knowledge proof included in the shielded exchange instruction may provide a certification that the a furnisher participant of the furnisher distributed ledger network is an owner a token that being exchange for a new token provided to a receiver participant of a receiver DLT network. The furnisher blockchain for the furnisher DLT network and the receiver blockchain for the receive DLT network may each store a smart contract. The smart contract of each blockchain may verify the zero-knowledge proof included in the shielded exchange instruction as a precondition to performing the private token exchange. The zero-knowledge proof may include, for example, a non-interactive zero-knowledge proof such as a Zero-Knowledge Succinct Non-Interactive Argument of Knowledge (zk-SNARK). In such cases, the zero-knowledge proof may be verified without performing additional communications with the furnisher participant and/or the receiver participant. Accordingly, the processing times and computing resources involved in performing a private token exchange between independent DLT networks may be reduced because less verification messages are sent between the furnisher DLT network and the receiver DLT network.

Alternatively or in addition, another example of a technical advancement achieved by the systems and method described below may be that the interoperability node may avoid erroneous duplication of records between DLT networks. For example, some of the hash values included in the shielded exchange instruction may be duplicative of hash values already stored in the furnisher blockchain or receiver blockchain. For example, the new token nullifier, which as a hash for a proposed token identifier for the receiver blockchain, may already be stored on the receiver blockchain. The interoperability node may avoid submitting the duplicate hash value to the receiver DLT, which may reduce the potential for erroneous duplication of information on the receiver blockchain. Alternatively or in addition, processing time and networking involved in detecting and correcting duplicate hash values may be reduced because the interoperability node may determine that a hash value is duplicative before the shielded exchange instruction is erroneously submitted to both the furnisher DLT and the receiver DLT.

Additional or alternative benefits, efficiencies, and improvements over existing market approaches are made evident in the systems and methods described below.

In general, a token may include a digital representation of commitment of a digital or physical asset to a recipient. For example, the token may include a note. The token may include, among other information, a token value, a token recipient, and a token identifier. The token value may include a value metric. The value metric may include a measure of the value or quantity of underlying assets, such as currency or goods. The token recipient may include an identifier of the recipient of the token. The recipient may be an owner user or an account. The identifier of the recipient may include a public key that is paired with a private key accessible by the recipient.

A token exchange may include generation one or more new tokens in exchange for one or more existing or selected tokens. State information indicative of retirement of the selected token, generation of the new token, and/or ownership of the selected token and new token may be stored in datablocks on the blockchain.

A private token exchange may include an exchange of tokens between entities in which no other entity can determine the parties involved in the transaction or ascertain the details of the tokens exchanged. In a private token exchange, state information may be associated with hashed versions of the tokens, such that the recipients and details of the tokens are undetectable without the pre-image image tokens. A blockchain may store digests (hashed values) of tokens and/or token information. The digests may obscure the tokens based on a hash function.

FIG. 1 illustrates a first example of a system 100 for shielded interoperability between DLT networks 104, 106. The system 100 may include an interoperability node 102. The interoperability node 102 may communicate with a furnisher DLT network 104 and a receiver DLT network 106. The furnisher DLT network 104 may include a furnisher participant node 108. The furnisher participant node 108 may include a furnisher DLT platform 110 and/or a furnisher blockchain 112. The receiver participant network may include a receiver participant node 114. The receiver participant node 114 may include a receiver DLT platform 116 and/or a receiver blockchain 118. The interoperability node 102 may facilitate a private token exchange between the furnisher participant 108 of the furnisher DLT network 104 and the receiver participant 110 of the receiver DLT network 106.

The interoperability node 102 may facilitate private token exchange where a token digest is selected and retired on the furnisher blockchain 112 and new token digest (a hash of a token) is generated on the receiver blockchain 118. By way of example, the furnisher DLT blockchain 112 may store multiple token digests. A token digest may refer to a hashed value of a token and/or information that identifies to the token. The furnisher participant node 108 may select, from the token digests, a token digest corresponding to a token to which the furnisher participant node 108 has access. In other words, the furnisher participant node 108 may select a token digest that was generated based on a hash function and a pre-hashed token that is selected by the furnisher participant. Because the furnisher participant node 108 has access to the pre-hashed token corresponding to the selected token digest, furnisher participant node 108 can validate ownership of the token digest based on a hash function.

The interoperability node 102 may cause the selected token digest to be retired on the furnisher blockchain 112 in exchange for a new token digest to be appended to the receiver blockchain 118. The new token digest may correspond to a new token that includes an asset amount of equal or lesser value than the selected token digest. The new token includes a public key of the recipient participant node 114. After furnisher blockading and the receiver blockchain 118 are updated, the furnisher participant node 108 may privately share the new token with the receiver participant node 114, for example through a messaging service or some other communication channel. The receiver participant node 114 may verify ownership of the new token digest based on the new token and a hash function.

Figure 2:
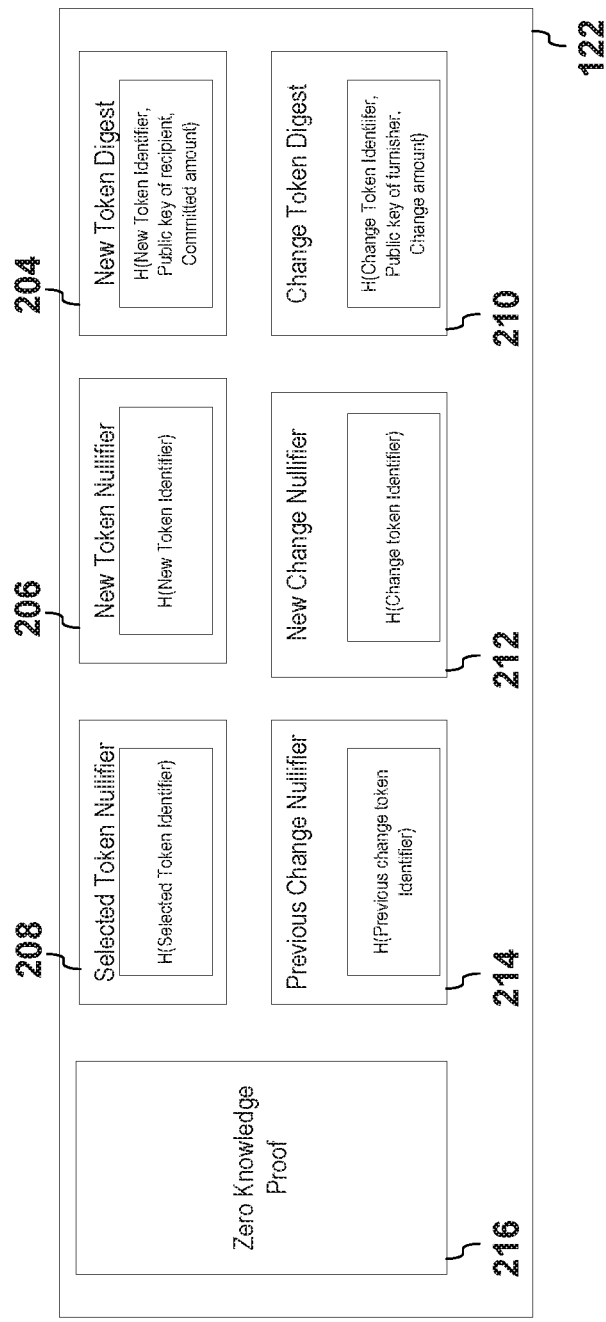
FIG. 2 illustrates an example of a shielded exchange instruction.
Figure 3:
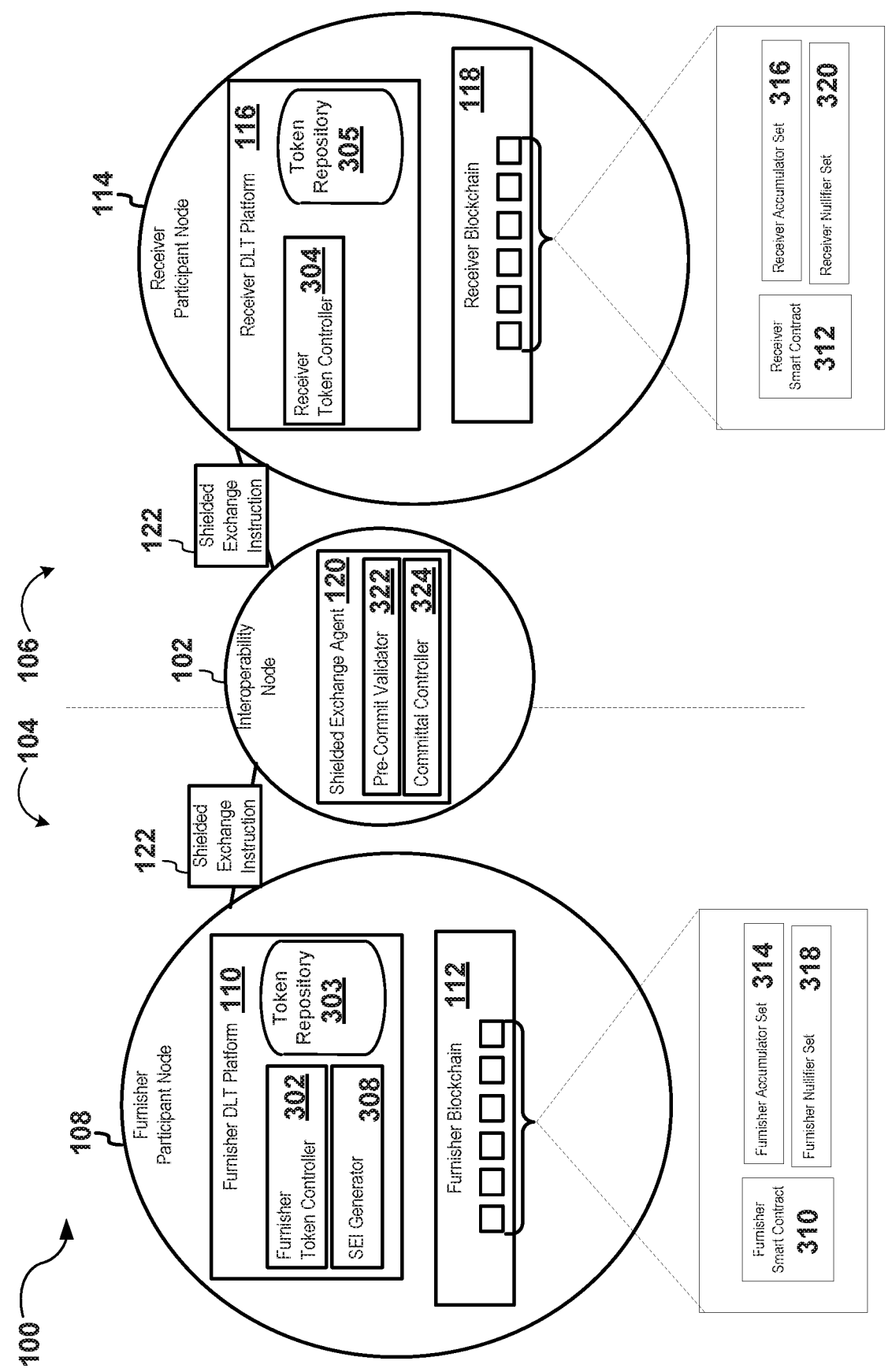
FIG. 3 illustrates a second example of a system.

The interoperability node 102 may include a shielded exchange agent 120. The shielded exchange agent 120 may receive a shielded exchange instruction 122. The shielded exchange agent 120 may verify and/or submit the shielded exchange instruction 122 to the furnisher DLT platform 110 and/or the receiver DLT platform 118. The shielded exchange instruction 122 include, among other information, the selected token digest and the new token digest. The shielded exchange instruction may cause the furnisher participant node 108 to update the furnisher blockchain 112 to reflect the selected token digest being retired. The furnisher DLT platform 110 may reject future shielded exchange instructions that include the selected token digest in response to the selected token digest being retired. Refer to FIG. 2 for a detailed description of an example of the shielded exchange instruction 122. Refer to FIG. 3 for a detailed description of the furnisher participant node 108, interoperability participant node 102, and receiver participant node 114.

In general, a DLT network may include a plurality of participant nodes that respectively communicate based on a DLT platform to submit, modify, and/or remove information stored on a blockchain. Participant nodes of the DLT network may communicate according to a consensus protocol implemented by the DLT platform to determine how to add, modify, organize, validate, and/or remove information stored on the blockchain. For example, a participant node of a DLT network may execute a consensus protocol of the DLT platform to determine whether to update a blockchain with new information (e.g. transactions) or modifications and removal of existing information. The consensus protocol may cause the participant node to communicate with other participants of the DLT network to determine changes to the blockchain are permitted. The participant(s) of the DLT network may append the information to the blockchain in response to consensus among the participants of the DLT network reaching agreement. New and/or updates to information may be appended to the blockchain according to the DLT. Each of the participant nodes may include a full or partial copy of a blockchain. The DLT platforms on each of the participant nodes may update the corresponding local copies of the blockchain based on the consensus protocol and/or underlying distributed ledger technology.

Among other features described herein, a DLT platform may enable interaction with a blockchain based on the rules, protocols, and architecture of a DLT. Each participant of a DLT network may implement a local instance of the DLT platform. A DLT platform instance configured on a first participant node may communicate with multiple DLT platform instances configured on additional participant nodes of the DLT network. The DLT platform may include, for example, the ETHEREUM™ platform, and include protocols such as QUORUM™ protocol to enable shielded transactions. Alternatively or in addition, the DLT platform may include additional or alternative features, as described herein. The DLT platform may receive requests to add, modify, or delete information stored on a blockchain, gain consensus among participant nodes of the furnisher DLT network, and then add, modify, and/or delete information on the blockchain.

A blockchain may include a ledger that is stored, organized, and/or implemented according to a DLT. The blockchain may include datablocks that are linked according to a cryptography. The arrangement of data blocks and associations between information stored in the data blocks are established by a DLT. For example, the blockchain may provide a growing, shared digital data flow, which serves as the source of truth between the participant nodes of a DLT network. Depending on the DLT, the datablocks of the blockchain may include a genesis datablock that is the initial datablock of the blockchain. Successive datablocks may be appended to the blockchain over time. The blockchain 106 may provide a chronological ledger of information. One or more of the successive datablocks may include a hash of a previous datablock, a hash of a header of the previous datablock, and/or a hash of portions of the previous datablock, depending in the DLT. Modifications to one or more datablocks in the blockchain may cause inconsistencies in the hashed information stored in the successive datablocks. The inconsistencies may be detected and the participant nodes of the DLT network. The consensus protocol by the participant nodes may prevent modification to previously appended or existing information in the blockchain. In some DLTs, modifications to the blockchain may be prohibited unless a majority, or some other predefined number, of the blockchain participants consent to the modifications.

As illustrated in FIG. 1, the system 100 may include a furnisher participant node 108. The furnisher participant node 108 may be a participant of the furnisher DLT network 104. For example, the furnisher participant node 108 may include a furnisher DLT platform 110 and a furnisher blockchain 112. The furnisher participant node 108 may be a node of the furnisher DLT network 104 at least because it implements the furnisher DLT platform 110. Thus, nodes that do not include the furnisher DLT platform 110 may not be participant nodes of the furnisher DLT network 104. Moreover, it should be appreciated that the furnisher DLT network 104 may include multiple furnisher DLT participant nodes. Each of the furnisher DLT participants may include a locally stored or executed instance of the furnisher DLT platform 110 and/or the furnisher blockchain 112. Each of the furnisher participant nodes may communicate between each other to reach consensus regarding additions, modifications, and/or deletions of information stored in the furnisher blockchain 112.

The system 100 may further include a receiver participant node 114. The receiver participant node 114 may be a participant of the receiver DLT network 104. For example, the receiver participant node 114 may include a receiver DLT platform and a receiver blockchain 118. The receiver participant node 114 may be a node of the receiver DLT network 106 at least because it implements the receiver DLT platform. Thus, nodes that do not include the receiver DLT platform may not be participant nodes of the receiver DLT network 106. Moreover, it should be appreciated that the receiver DLT network 106 may include multiple receiver DLT participant nodes. Each of the receiver DLT participants may include a locally stored or executed instance of the receiver DLT platform 116 and/or the receiver blockchain 118. Each of the receiver participant nodes may communicate with each other to reach consensus regarding additions, modifications, and/or deletions of information stored in the receiver blockchain 118.

In some examples, the interoperability node 102 may communicate with the furnisher DLT platform 110 remotely via one or more furnisher participant nodes. Alternatively or in addition, the interoperability node 102 may communicate with the receiver DLT platform 116 remotely via one or more receiver participant nodes. In other examples, the interoperability node 102 may communicate with the furnisher DLT platform 110 and/or the receiver DLT platform 116 locally. For example, the interoperability node 102 may be a participant node of the furnisher DLT network 104 104, the receiver DLT network 106, or both. The interoperability node 102 may include a local instance of the furnisher DLT platform 110, the furnisher blockchain 112, the receiver DLT platform 116, and/or the receiver blockchain 118.

While the example illustrated in FIG. 1 shows a furnisher DLT network 104 and a receiver DLT network 106, the interoperability node 102 may facilitate private exchange token information between any number of DLT networks. Furthermore, the furnisher DLT network 104, the receiver DLT network 106, and/or other DLT networks accessed by the interoperability node 102 may implement a same or different type of DLT platform. As described herein the furnisher DLT network 104 and the receiver DLT network 106 may include separate DLT networks. The terms "furnisher" and "receiver" may distinguish each DLT network and or participants of each network.

FIG. 2 illustrates an example of the shielded exchange instruction 122. The shielded exchange instruction 122 may include a digital representation of an asset exchange between multiple entities such that does not reveal what was transferred and/or the identities of entities involved in the transfer. The shielded exchange instruction 122 may include a hash (or hashes) of transaction information including, for example, respective identifiers of the parties, one or more tokens being transferred between the parties. The shielded exchange instruction 122 may further include a zero-knowledge proof of the validity of the transaction, and/or the validity of the hashed transaction information included in the transaction. For example, the token exchange instruction may include a new token digest 204, a new token nullifier 206, and a selected token nullifier 208. The shielded exchange instruction 122 may be interchangeably referred to as a shielded transaction.

The new token digest 204 may include a hash value of a token. Alternatively or in addition, the new token digest 204 may include, among other information, a token value being committed to a recipient (for example an amount of a currency or goods), a public key of a recipient that a new token is being committed to, and a new token identifier for a new token. The new token identifier may include an identifier of the new token. The new token identifier may include a value that is randomly generated, such as a random number.

The new token nullifier 206 may include a hash value of the new token identifier. The selected nullifier 208 may include a hash of a selected token identifier. The selected token identifier may include an identifier of a token that is selected for retirement in order to generate the new token.

In some examples, the token value of the new token may be less than the token value of the selected token for the private token exchange. The shielded exchange instruction 122 may include hashed information corresponding to a change token that is generated for a furnisher. For example, the shielded exchange instruction 122 may include a new change token digest 210, a new change nullifier 212, and a previous change nullifier 214.

The new change token digest 210 may include a hash value of a change token and/or various information related to the change token. For example, the change token digest 210 may include a hash of, among other information, a change value for the furnisher (for example currency value, quantity of goods, etc), a public key of the furnisher, and a change token identifier. The change token identifier may include an identifier of the change token. The change token identifier may be a randomly generated number.

The new change nullifier 212 may include a hashed value of the change token identifier. The previous change nullifier 214 may include a hashed value of a previous change token identifier. In many implementations, a DLT platform or a smart contract that processes the shielded exchange instruction 122 may specify that an existing nullifier must be specified to generate a token digest. Accordingly, the previous change nullifier 214 may include a random value or a null value because the change token digest is a new token that is being created.

The shielded exchange instruction 122 may further include a zero-knowledge proof 216. In general, the zero-knowledge proof 216 may include logical proof indicative of a prover knowing or having access to a secret without revealing the secret. The zero-knowledge proof 216 include information that, when evaluated, proves to a verifier that a particular statement is true, without revealing any information except the validity of the statement. In an example, a hash function may generate a hash of a random number. A zero-knowledge proof 216 may prove, to a verifier, that the prover has access to the random number, without revealing the random number.

Stated in another way, the zero-knowledge proof 216 may prove that a furnisher participant owns one or more tokens (or an amount of token value) without revealing information that could be used to spend the one or more tokens on a blockchain. In the context of a selected token for the shielded exchange instruction 122, the zero-knowledge proof 216 may prove that the furnisher participant has access to a pre-hashed version of the selected token. For example, the zero-knowledge proof 216 may prove that the furnisher participant has access to the token identifier and the token value corresponding to the selected token nullifier. The zero-knowledge proof 216 may prove that the selected token nullifier 208 exists on the blockchain and the selected token nullifier 208 is not retired. The zero-knowledge proof 216 may prove that public key of selected token corresponds to the private key of the furnisher participant.

In some examples, the zero-knowledge proof 216 may be a non-interactive zero-knowledge proof 216, such as a zk-SNARK. The statements asserted by the non-interactive zero-knowledge proof 216 may be verified without communicating with any parties that referenced by the statement. For example, a non-interactive zero-knowledge proof 216 can be used to verify the statement "party X has access to the pre-image value of hash(Y)" without communicating with party X and/or revealing the value of Y.

FIG. 3 illustrates a second example of the system 100. Reference to the shielded exchange instruction 122 described in reference to FIG. 2 is made throughout the following discussion.

Token Controller

The furnisher DLT platform 110 may include a furnisher token controller 302 and/or a furnisher token repository 303. The receiver DLT platform 116 may include a receiver token controller 304 and/or a receiver token repository 305. In general, a token controller may provide an interface to store, manage, access, and/or perform operations with tokens, or token digests as in private token exchange. The token controller may perform off-chain operations related to communicating, selecting, and/or managing tokens available for a user. For example, the token controller may enable a user to view tokens owned by the user, select tokens for private token exchange and/or select recipient for private token exchange.

A token repository may refer to a repository of tokens that is associated with or accessible to one or more particular accounts or users. For example, the token repository may store one or more tokens and/or token information. Alternatively or in addition, the token repository may store token identifiers, token values, recipient public keys of the tokens, and other information related to the token.

The furnisher token repository 303 may store one or more token identifiers corresponding to the furnisher token controller 302. The furnisher token controller 302 may select a token from the furnisher token repository 303 for use in a private token exchange with the receiver token controller 304. For example, the furnisher token controller 302 may generate a new token to be communicated to the receiver token controller 304 after selected token is retired. The furnisher token controller 302 may obtain a shielded exchange instruction 122 to exchange the furnisher token with the new token. After the furnisher blockchain 112 and/or the receive blockchain 118 are updated based on the shielded exchange instruction 122, the furnisher token controller 302 may communicate the new token to the receiver token controller 304. Because the receiver token controller 304 now has access to the new token, the receiver token controller 304 can generate a second shielded exchange instruction 122 with a zero-knowledge proof 216 that the receiver token controller knows the token identifier of the new token. The resultant token exchange is kept private because the details of the token exchange that are stored on the furnisher blockchain 112 and the receiver blockchain 118 are obscured by based on cryptographic hashing.

Shielded Exchange Instruction Generator

The furnisher DLT platform 110 may include a shielded exchange instruction generator (SEI generator) 308. The SEI generator 308 may generate the shielded exchange instruction 122. For example, the SEI generator 308 may receive creation parameters that are used to generate the zero-knowledge proof 216, the new token digest 204, the new token nullifier 206, selected nullifier 208, the change token digest 210, the new change nullifier 212, the previous change nullifier 214, the zero-knowledge proof 216, and/or any other information included in the shielded exchange instruction 122.

The SEI generator 308 may receive various creation parameters to generate the shielded exchange instruction 122. The creation parameters may include some or all of the creation parameters included in Table 1.

TABLE 1

Creation Parameters for Shielded Exchange Instruction

| | |
|---|---|
| Selected token identifier | An identifier of the token that is selected for the exchange. The selected token identifier may be retired in response to the private token exchange. |
| Selected token value. | An amount indicative of the value of a token corresponding to the selected token identifier. |
| Furnisher private key | A private key that is paired with the public key of the furnisher token controller. The private key may be applied to assert that the prover has access to the private key cryptologically paired with the public key. |
| Selected token digest identifier | An address of the selected token digest on the furnisher blockchain. Alternatively or in addition, the selected token digest identifier may include an address or identifier may include an address or identifier of the selected token digest within multiple token digests in an accumulator set stored across multiple data blocks on the furnisher blockchain. The accumulator set may include a data structure, such as a Merkle tree. |
| New token Identifier | An identifier of a new token for the receiver note controller. The new token identifier may include a randomly generated number. |
| New token value. | The asset amount for the new token. |
| Change token identifier | An identifier a change token. The change identifier may include a randomly generated number. |
| Change token value | An asset value amount for the change token. The change token value may include a difference between the selected token value amount and the new token value amount. |
| Furnisher Smart Contract Address | The address of the furnisher smart contract stored on the furnisher blockchain. |
| Destination Blockchain | An identifier of the receiver blockchain. |
| Recipient public key | The public key of the receiver token controller. |

One or more smart contracts may receive the shielded exchange instruction 122 to perform a private token exchange based on the shielded exchange instruction.

Furnisher Smart Contract and Receiver Smart Contract

The furnisher blockchain 112 may include a furnisher smart contract 310. The receiver blockchain 118 may include a receiver smart contract 312. In general, a smart contract may include rules and/or criteria that dictate how information is to be stored on a blockchain and/or a protocol for updating information to various states. A smart contract may include data structure definitions, such as a Merkle tree, for representing data stored accords multiple blocks on a blockchain. The smart contract may further include logic for communicating with a consensus protocol to cause changes to a blockchain. For example, the smart contract may submit transactions to a consensus protocol. In response to consensus among participants of a DLT network, the transaction may cause information to be appended to the blockchain, modified, and/or deleted. A smart contract may be stored in one or more datablock on a blockchain. The smart contract may be identified within the blockchain based on a smart contract address. The smart contract address may include the address of a datablock that stores the smart contract and/or an identifier of the smart contract.

The furnisher smart contract 310 may include an example of a smart contract that includes rules, criteria, data structures, and/or logic for adding, searching, removing, and/or modifying nullifiers and/or token digests stored on the furnisher blockchain 112. For example, the furnisher smart contract 310 may include logic that processes the shielded exchange instruction 122. Alternatively or in addition, the furnisher smart contract 310 may include logic for appending datablocks to the furnisher blockchain 112 to log a private token exchange between participant nodes of one or more DLT network.

The receiver smart contract 312 may include an example of a smart contract that includes rules, criteria, data structures, and/or logic for adding, searching, removing, and/or modifying nullifiers and/or token digests stored on the receiver blockchain 118. For example, the receiver smart contract 312 may include logic that processes the shielded exchange instruction 122. Alternatively or in addition, the receiver smart contract 312 may include logic for appending datablocks to the receiver blockchain 118 to log a private token exchange between participant nodes of one or more DLT network.

The furnisher smart contract 310 and/or the receiver smart contract 312 may validate and/or process the shielded exchange instruction 122. For example, the furnisher smart contract 310 and/or the receiver smart contract 312 may verify the zero-knowledge proof 216 included in the shielded exchange instruction 122. In examples where the zero-knowledge proof 216 is a non-interactive zero-knowledge proof 216, such as zk-SNARKS, the furnisher smart contract 310 and/or the receiver smart contract 312 may determine the validity of the zero-knowledge proof 216 without communicating with the furnisher token controller 302 and/or the receiver token controller 304 to prove the statements asserted by the zero-knowledge proof 216. After the zero-knowledge proof 216 is verified by the furnisher smart contract 310, the furnisher smart contract 310 may submit one or more transactions to the furnisher DLT platform 110 that cause one or more datablocks to be appended to the furnisher blockchain 112. Alternatively or in addition, after the zero-knowledge proof 216 is verified by the receiver smart contract 312, the receiver smart contract 312 may submit one or more transactions to the receiver DLT platform 116 that causes one or more datablocks to be appended to the receiver blockchain 118.

Accumulator Set

The furnisher blockchain 112 may store a furnisher accumulator set 314. Alternatively or in addition, the receive blockchain may store a receiver accumulator set 316.

In general, an accumulator set may include multiple token digests that are stored on a blockchain. For example, each of the token digests may be stored in datablocks on a blockchain. The token digests may be associated with reference information that references other datablocks and/or token digests stored on the blockchain. The reference information may allow token digests included in the accumulator set to be traversed and/or searched. Accordingly, the token digests may be arranged in a Merkle tree, or some other suitable data structure. Table 2 includes a logical representation of an example accumulator set.

TABLE 2

Example Accumulator Set

| Token Digest Identifier | H(Amount, Public Key, Token Identifier) |
|---|---|
| 1 | 0X9A2F243216FA23214 . . . |
| 2 | 0X012F34A2FFF323421 . . . |

It should be appreciated that the information in Table 1 represents a logical representation of a series of token digests stored at various locations in a blockchain. For example, the token commitments and/or datablocks on the blockchain may include various information that a smart contract may use to create a data structure representative of the accumulator set.

The furnisher accumulator set 314 may include an example of an accumulator set that includes one or more token digests stored on the furnisher blockchain 112. The receiver accumulator set 316 includes an example of an accumulator set that includes one or more token digests stored on the receiver blockchain 118. The furnisher smart contract 310 may manage the furnisher accumulator set 314 independently of the receiver accumulator set 316. For example, the furnisher smart contract 310 may update the furnisher blockchain 112, but not the receive blockchain 118 in response to receipt and verification of a shielded exchange instruction 122.

Nullifier Set

The furnisher blockchain 112 may further include a furnisher nullifier set 318. Alternatively or in addition, the receiver blockchain 118 may include a receiver nullifier set 320.

In general, a nullifier set may include multiple nullifiers stored on the blockchain. As discussed in reference to FIG. 2, a nullifier may include a digest (hash value) of a token identifier. Nullifiers of a nullifier set may be stored in across one or more datablocks one blockchain. The nullifiers may include reference information that allows the nullifiers to be referenced, searched, and/or traversed in the blockchain. For example, the nullifier set may be arranged in a linked list, a key-value pair table, and/or any other suitable data structure. The nullifier set may associate a nullifier with retirement information, such as a retirement flag. The retirement flag may indicate whether a token digest with the same token identifier as the nullifier may be used in a shielded transaction. Table 3 illustrates an example of a nullifier set.

TABLE 3

Example Nullifier Set

| H(Token Identifier) | Retired Flag |
|---|---|
| 0x3AFA30F0234FC204 . . . | 1 |
| 0x5B2032891034AFB85 . . . | 0 |

It should be appreciated that the information in Table 2 represents a logical representation of a nullifiers stored in one or more datablocks on a blockchain. The nullifiers and/or datablocks on the blockchain may include various information that the smart contract may use to create a data structure representative of the nullifier set.

In response to receipt of the shielded exchange instruction 122, the receiver smart contract 312 may cause the new token digest 204 of the shielded exchange instruction 122 to be appended to the receiver accumulator set 316. Furthermore, the receiver smart contract 312 may cause the new token nullifier 206 to be appended the receiver nullifier set 320. The furnisher smart contract 310 may flag the selected nullifier 208 as retired. Accordingly, the receiver blockchain 118 logs the creation of the new token digest 204 and the furnisher blockchain 122 logs the retirement of the selected token digest.

The furnisher token controller 302 may communicate, off-chain, the token and/or token information to the receiver token controller 304. For example, the furnisher token controller 302 may communicate the token identifier and/or the token value to the receiver token controller 304. Since the receiver token controller 304 already has access the public key for the receiver token controller 304, the receiver token controller 304 may verify that the token digest. For example, the receiver token controller 304 may the received token to a hash function that regenerates a token digest. The receiver token controller 304 may compare the regenerated token digest to the new token digest 204 stored in the accumulator set. If the regenerated token digest and the new token digest match, the receiver token controller 304 has verified that the receiver token controller 304 owns the new token. Furthermore, the receiver token controller 304 may retire the new token nullifier corresponding to the new token digest 204 in future private token exchanges.

In examples where the private token exchange involves change, the furnisher smart contract 310 may further add the previous change nullifier 214 and the new change nullifier 212 to the nullifier set. The previous change nullifier 214 may be added to the nullifier set because the furnisher smart contract 310 may dictate that when a token digest is created, a pre-existing nullifier (the nullifier to be retired), and a nullifier for the token digest, must be provided. Since the previous change nullifier 214 may not exist in the furnisher nullifier set 318, the furnisher smart contract 310 may create the previous change nullifier 214 and flag it as retired. The new change nullifier 212 may be flagged as not retired so that the change token digest 210 can be included in a future token exchange instruction.

Shielded Exchange Agent

The shielded exchange agent 120 may include a pre-commit validator 322. The pre-commit validator 322 may determine whether the shielded exchange instruction 122 includes valid information. For example, the new token nullifier 206 have been generated without knowledge of the nullifiers already included in the receiver nullifier set 320. The pre-commit validator 322 may determine whether the hash value for the new token nullifier 206 is already included in the receiver nullifier set 320. If it is, the pre-commit validator 322 may invalidate the shielded exchange instruction 122. The SEI generator 308 may re-generate the shielded exchange instruction 122 in response invalidation of the shielded exchange instruction 122 so that the hash value of the new token nullifier 206 is different.

The interoperability node 102 may further include a committal controller 324. The committal controller 324 may submit the shielded exchange instruction 122 to the furnisher DLT platform 110 and/or the receiver DLT platform 116. For example, the furnisher DLT platform 110 may expose the logic of the furnisher smart contract 310. For example, the furnisher DLT platform 110 may identify and/or provide the furnisher smart contract 310 based on address of the furnisher smart contract 310. When the furnisher smart contract 310 receives the shielded exchange instruction 122, the furnisher smart contract 310 may update the furnisher accumulator set 314 and/or the furnisher nullifier set 318.

Figure 4:
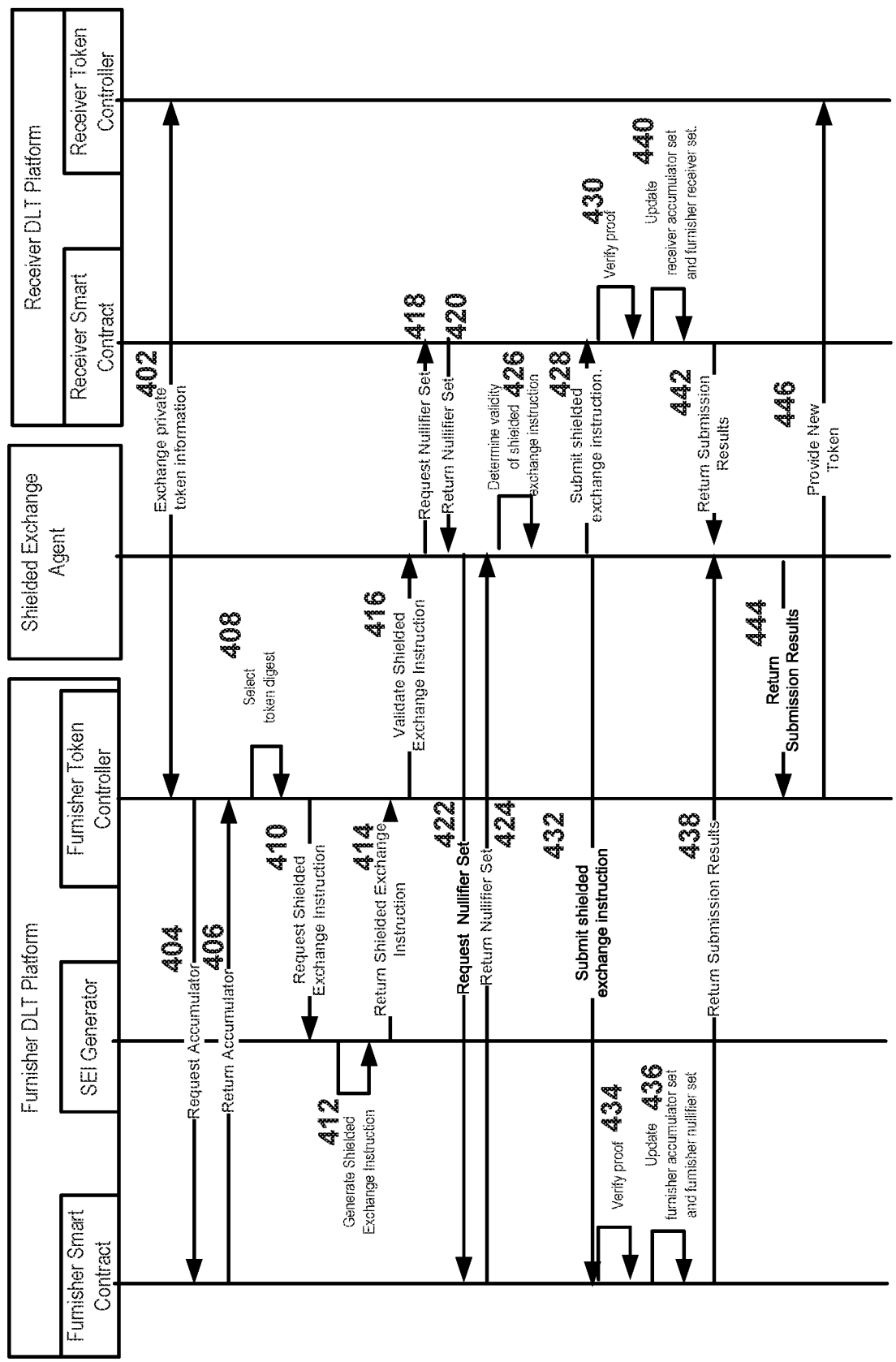
FIG. 4 illustrates a sequence diagram for a system.

FIG. 4 illustrates a sequence diagram for the system 100. The furnisher token controller 302 and the receiver token controller 304 may exchange private transfer information (402). The private transfer information may include a token value and/or a receiver public key for a token. In some examples, the private transfer information may further include an address of the receiver smart contract 312, which may be provided to the receiver DLT platform 116 to obtain or access the receiver smart contract 312.

In an example, a first user may privately agree with a second user to perform a private token exchange. The first user may fund a token that is to be supplied for the private transaction. A token digest corresponding to the token may be added to the furnisher blockchain 112, and the token may be added to the furnisher token repository 303. Alternatively or in addition, the first user may select a pre-existing token for the transaction from the furnisher token repository 303. In other examples, the furnisher token controller 302 may automatically select a token that is owned by the first user (i.e. a token in which the amount and token identifier are known).

The furnisher token controller 302 may request the furnisher accumulator set 314 via the furnisher smart contract 310 (404). The furnisher smart contract 310 may return the furnisher accumulator set 314 (or a portion thereof) to the furnisher token controller 302 (406). The furnisher token controller 302 may select one or more token commitments from the furnisher accumulator set 314 (408).

For example, the furnisher smart contract 310 may search the furnisher blockchain 112 for the furnisher accumulator set 314 and/or digests. The furnisher smart contract 310 may return the furnisher accumulator set 314 and/or one or more token digests.

The furnisher token controller 302 may have access to a pre-hashed token corresponding to the token digests. For example, the pre-hashed token may be stored in the furnisher token repository 303. The pre-hashed token may include a token value and/or a token identifier. The furnisher token controller 302 may a token with a token value equal to or greater than an exchange value (the amount of value being sent from the first user to the second user). The furnisher token controller 302 may identify the selected token nullifier 208 in the furnisher nullifier set 318. The furnisher token controller 302 may retire the selected nullifier and generate a new token digest 204 for the receiver furnisher controller. Thus, the furnisher token controller 302 may "spend" the selected nullifier corresponding to the selected token digest in exchange for creating the new token digest 204.

The furnisher token controller 302 may request a shielded exchange instruction 122 from the SEI generator 308 (410). The SEI generator 308 may generate the shielded exchange instruction 122 (412). The SEI generator 308 may return the shielded exchange instruction 122 to the furnisher token controller 302 (414). The furnisher token controller 302 may validate the shielded exchange instruction 122 with the shielded exchange agent 120 (416).

For example, the new token nullifier 206 that was generated for the shielded exchange instruction 122 may already exist in the receiver nullifier set 320. If the new token nullifier 206 already exists in the receiver nullifier set 320, then the random number generated for the new token identifier is invalid. Alternatively or in addition, the new change nullifier 212 and/or the previous change nullifier 214 that was generated for the shielded exchange instruction 122 may already exist in the furnisher nullifier set 318. If the new change nullifier 212 and/or the previous change nullifier 214 already exists in the receiver nullifier set 320, then the shielded exchange instruction 122 may be invalid.

In some examples, the furnisher token controller 302 may communicate the shielded exchange instruction 122 to the shielded exchange agent 120 for validation. In other examples, the furnisher token controller 302 may communicate portions of the shielded exchange instruction 122 that are being validated, such as the new token nullifier 206.

In some examples, the shielded exchange agent 120 may receive the addresses of any smart contracts that are being accessed, such as the furnisher smart contract 310 and/or the receiver smart contract 312. The shielded exchange agent 120 may provide the address of the furnisher smart contract 310 to furnisher DLT platform 110 to gain identify and/or access to the furnisher smart contract 310 stored on the furnisher blockchain 112. Alternatively or in addition, the shielded exchange agent 120 may provide the address of the receiver smart contract 312 to the receiver DLT platform 116 to identifier and/or access the receiver smart contract 312 stored on the receiver blockchain 118.

The shielded exchange agent 120 may request the receiver nullifier set 320 from the receiver smart contract 312 (418). The receiver smart contract 312 may return the receiver nullifier set 320 (420). The shielded exchange agent 120 may request the furnisher nullifier set 318 from the furnisher smart contract 310 (422). The furnisher smart contract 310 may return the furnisher nullifier set 318 (424). The furnisher smart contract 310 may determine whether the shielded exchange instruction 122 is valid (426).

For example, the shielded exchange agent 120 may search the receiver nullifier set 320. In response to determination that the receiver nullifier set 320 includes the new token nullifier, the shielded exchange agent 120 may determine that the new token nullifier is invalid (and thus the shielded exchange instruction 122 is invalid). Alternatively or in addition, the shielded exchange agent 120 may search the furnisher nullifier set 318 for the change nullifier. In response to determination that the furnisher nullifier set 318 includes the change nullifier, the shielded exchange agent 120 may determine that the change nullifier is invalid (and thus the shielded exchange instruction 122 is invalid). In some implementations, the furnisher token controller 302 may instead determine the validity of the change nullifier since the furnisher token controller 302 may have access to the furnisher blockchain 112. If the new token nullifier does not exist in the receiver nullifier set 320 and/or the change nullifier does not exist in the furnisher nullifier set 318, the shielded exchange agent 120 may determine that the shielded exchange instruction 122 is valid.

The shielded exchange agent 120 may submit the shielded exchange instruction 122 to the receiver smart contract 312 (428). The receiver smart contract 312 may verify the zero-knowledge proof 216 of the shielded exchange instruction 122 (430). Alternatively or in addition, the shielded exchange agent 120 may submit the shielded exchange instruction 122 to the furnisher smart contract (432). The furnisher smart contract 310 may verify the zero-knowledge proof 216 of the shielded exchange instruction 122 (434).

For example, the furnisher smart contract 310 and/or the receiver smart contract 312 may receive the zero-knowledge proof 216. In some examples, the zero-knowledge proof 216 may include a non-interactive zero-knowledge proof 216, such as a zk-SNARK. Accordingly, the furnisher smart contract 310 and/or the receiver smart contract 312 may determine the validity of the zero-knowledge proof 216 without requesting additional information from any node, party, and/or system. The zero-knowledge proof 216 may include a proof that the furnisher token controller 302 has access to the token amount and/or token identifier of the selected token. After receiving the zero-knowledge proof 216, the furnisher smart contract 310 and/or the receiver smart contract 312 may determine the validity of the zero-knowledge proof 216 without further communicating with the furnisher token controller 302 and/or the receiver token controller to proof that the furnisher token controller 302 has access to the token and/or token identifier of the selected token.

The furnisher smart contract 310 may update the furnisher accumulator set 314 and the furnisher nullifier set 318 (436). The furnisher smart contract 310 may return submission results to the shield exchange agent (438). The receiver smart contract 312 may update the receiver accumulator set 316 and the receiver nullifier set 320 (440). The receiver smart contract 312 may return submission results to the shield exchange agent 120 (442).

For example, the furnisher smart contract 310 may cause one or more datablocks to be appended to the furnisher blockchain 112 that sets the retire flag of the selected token nullifier 208 to true. Alternatively or in addition, the datablocks may include add the change nullifier to the furnisher nullifier set 318 and the change digest to the accumulator set.

The receiver smart contract 310 may cause one or more datablocks to be appended to the receiver blockchain 118 that add the new token nullifier 206 to the receiver nullifier set 320, and add the new token digest 204 to the receiver accumulator set 316.

The shield exchange agent 120 may return the submission results to the furnisher token controller 302 (444). The furnisher token controller 302 may provide the new token, or portions thereof, to the receiver token controller 304 (446).

For example, in response to receiving the token identifier and/or the token amount of the new token, the furnisher token can identify and obtain the new token nullifier 206 and the new token digest 204 stored on the receiver blockchain 118. Accordingly, the receiver token controller 304 may include obtain a new shielded exchange instruction 122 that retires (spends) the new token nullifier 206 in a future private token exchange.

EXAMPLE

By way of example, suppose the initial states of the furnisher accumulator set 314 and the furnisher nullifier set 318 are illustrated in tables 4-5, respectively. For purposes of illustration, the tables show the pre-image values of hash values stored in the furnisher accumulator set 314 and the furnisher nullifier set 318.

TABLE 4

Example Furnisher Accumulator Set (Pre-image)

| Token Digest Identifier | Token Value | Recipient Public Key | Token Identifier |
|---|---|---|---|
| 1 | 100 | A | 92370 |
| 2 | 20 | C | 4 |
| 3 | 80 | A | 747578 |

TABLE 5

Example Furnisher Nullifier Set (Pre-Image)

| Token Identifier | Retired |
|---|---|
| 92370 | True |
| 555 | True |
| 4 | False |
| 747578 | False |

In this example, a furnisher participant with a public key A has already sent an asset having a value of 20 to another furnisher participant having the public key C. In that transaction, the shielded exchange instruction 122 may have included the following:
Selected token nullifier=H(92370);
New token nullifier=H(4);
New token digest=H(4, C, 20);
New change token=H(747578, A, 80);
New change nullifier=H(747578); and
Previous change nullifier=H(555).

Since the furnisher nullifier set 318 includes the new token nullifier, the exchange occurred between participants of the furnisher DLT network 104.

Suppose that the furnisher participant controller is instructed to send the receiver token controller 304 an asset having a token value of 75. The receiver token controller 304 may be included in the receiver participant node 114 of the receiver DLT network 106, which is separate from the furnisher DLT network 104. The initial states of the receiver accumulator set 316 and the receiver nullifier set 320 are illustrated in Tables 6-7. For purposes of explanation, Tables 6-7 include the pre-image values of the hashes stored in the receiver accumulator set 316 and the receiver nullifier set 320.

TABLE 6

Example Receiver Accumulator Set (Pre-image)

| Token Digest Identifier | Token Value | Recipient Public Key | Token Identifier |
|---|---|---|---|
| 1 | 60 | B | 80 |
| 2 | 40 | D | 1 |
| 3 | 20 | B | 22 |

TABLE 7

Example Receiver Furnisher Set (Pre-image)

| Token Identifier | Retired |
|---|---|
| 80 | True |
| 556 | True |
| 1 | False |
| 22 | False |

In a private token exchange between the furnisher DLT network 104 and the receiver DLT network 106, the receiver token controller 304 may communicate a receiver public key to the furnisher token controller 302. The furnisher token controller 302 may select token digest #3 from the furnisher accumulator set 314 because token digest #3 has a token value greater than 75 and the nullifier H(747578) is not retired.

The furnisher token controller 302 may communicate with the SEI generator 308 to generate the shielded exchange instruction 122 for this transaction. For example, the furnisher token controller 302 may provide the following inputs to the SEI generator 308, which may generate the shielded exchange instruction 122 off-chain:

Selected token identifier (747578);
Selected token value (80);
Public key of selected token recipient (A);
Private key of selected token recipient (A);
Previous change token Identifier (111);
Contract address of furnisher smart contract;
Contract address of receiver smart contract;
Recipient's public key (B);
Exchanged token value (75); and
Change token value (5).

The SEI generator 308 may generate a shielded exchange instruction 122 with the following values:

New token digest=H(208, B, 75);
Selected token nullifier=H(747578);
New token nullifier=H(208);
New change digest=H(94, A, 5);
New change nullifier=H(94); and
Previous change nullifier=H(111).

The interoperability node 102 may receive the furnisher nullifier set 318 and the receiver nullifier set 320. The interoperability node 102 may verify that the new change nullifier (H(94)) and/or the previous change nullifier (H(111)) does not exist in the furnisher nullifier set 318. The interoperability node 102 may verify that the new token nullifier (H(208)) does not exist in the receiver nullifier set 320.

The shielded exchange instruction 122, or components of the shielded exchange instruction 122, are submitted to the furnisher smart contract 310 and the receiver smart contract 312.

The furnisher smart contract 310 may update the furnisher accumulator set 314 and the furnisher nullifier set 318. Table 8-9 shows the furnisher accumulator set 314 and the furnisher nullifier set 318 after the shielded exchange instruction 122 has been processed by the furnisher smart contract 310:

TABLE 8

Example Furnisher Accumulator Set (Pre-image) After Private Token Exchange

| Token Digest Identifier | Token Value | Recipient Public Key | Token Identifier |
|---|---|---|---|
| 1 | 100 | A | 92370 |
| 2 | 20 | C | 4 |
| 3 | 80 | A | 747578 |
| 4 | 5 | A | 94 |

TABLE 9

Example Furnisher Nullifier Set (Pre-image) After Private Token Exchange

| Token Identifier | Retired |
|---|---|
| 92370 | True |
| 555 | True |
| 4 | False |
| 747578 | True |
| 111 | True |
| 94 | False |

The receiver smart contract 312 may update the receiver accumulator set 316 and the receiver nullifier set 320. Tables 10-11 show the receiver accumulator set 316 and the receiver nullifier set 320 after the shielded exchange instruction 122 has been processed by the receiver smart contract 312:

TABLE 10

Example Receiver Accumulator Set (Pre-Image) After Private Token Exchange

| Token Digest Identifier | Token Value | Recipient Public Key | Token Identifier |
|---|---|---|---|
| 1 | 60 | B | 80 |
| 2 | 40 | D | 1 |
| 3 | 20 | B | 22 |
| 4 | 75 | B | 208 |

TABLE 11

Example Receiver Nullifier Set (Pre-Image) After Private Token Exchange

| Token Identifier | Retired |
|---|---|
| 80 | True |
| 556 | True |
| 1 | False |
| 22 | False |
| 208 | False |

Accordingly, the receiver accumulator includes the new token digest (H(208, B, 75)) and the receiver nullifier set 320 includes the new token nullifier (H(208)). The new token nullifier is not flagged as retired and it can be included in future shielded exchange instructions to perform additional private token exchanges. The furnisher nullifier set 318 tracks that the selected nullifier (H(747578)) was retired. Thus the selected token may no longer be used in future private token exchanges.

Figure 5:
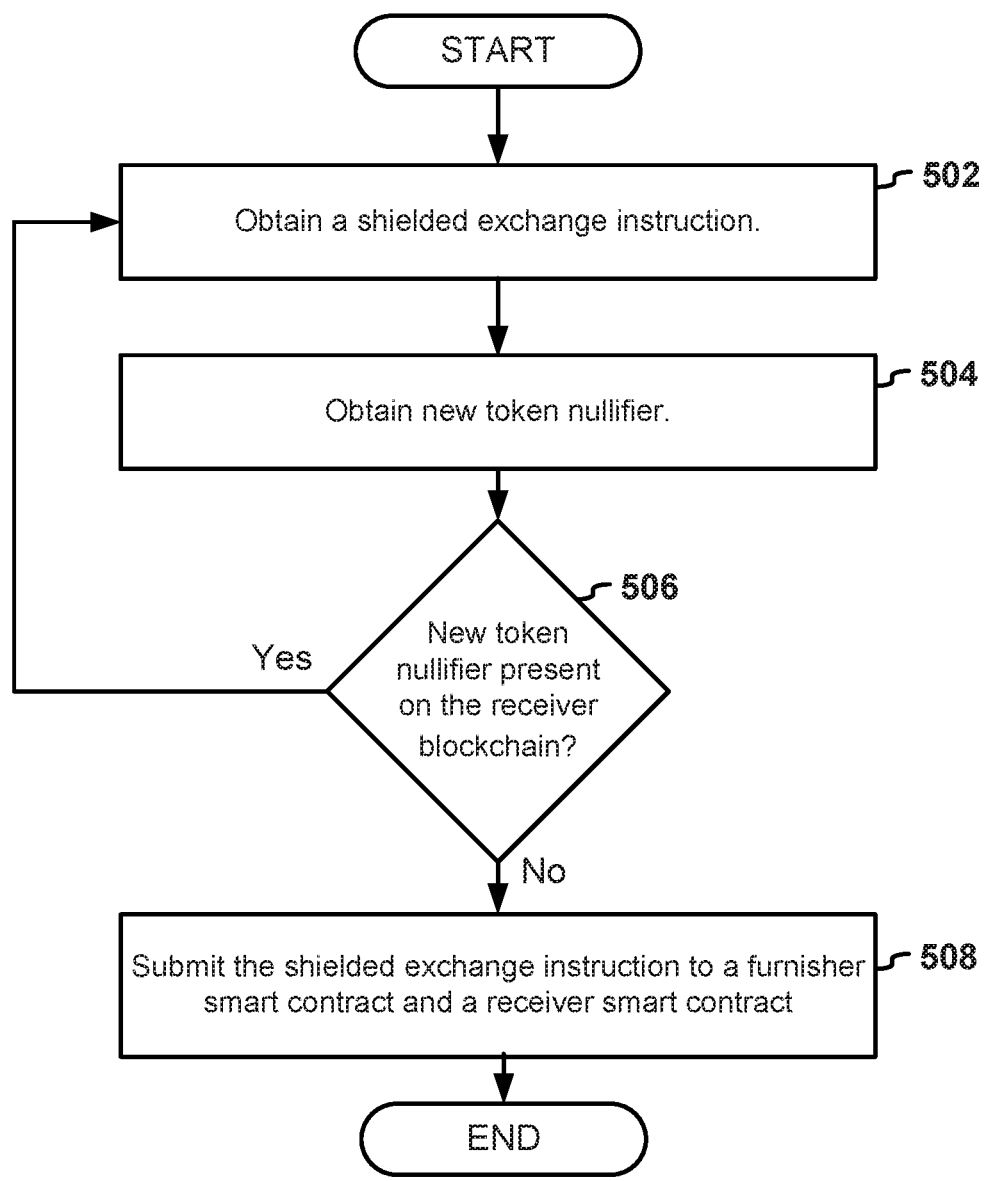
FIG. 5 illustrates a first flow diagram of example logic for a system.

FIG. 5 illustrates a first flow diagram of example logic for the system 100. The shielded exchange agent 120 may obtain a shielded exchange instruction 122 (502). For example, the shielded exchange agent 120 may receive the shielded exchange instruction 122 from the furnisher token controller 302.

The shielded exchange instruction 122 may include at least a zero-knowledge proof 216, a selected token nullifier, a new token nullifier, and a new token digest. The new token digest may include a hash of at least a recipient public key of the receiver participant and the new token identifier. As discussed in reference to FIG. 2, the selected token nullifier 208 may include a hash of a token selected for retirement on the furnisher blockchain 112. The new token nullifier may include a hash of a new token identifier that is to be provided to a recipient in exchange for the selected token. The zero-knowledge proof 216 may be indicative of the furnisher participant having access to the selected token identifier.

The shielded exchange agent 120 may obtain the new token nullifier 206 (504). For example, the new token nullifier 206 may be included in the shielded exchange instruction 122. The shielded exchange agent 120 may extract the new token nullifier 206 form the shielded exchange agent 120. In other examples, the furnisher token controller 302 may communicate the new token nullifier 206 to the shielded exchange agent 120. Alternatively or in addition, the shielded exchange agent 120 may obtain the previous change nullifier 214 and/or the new change nullifier 212 to the shielded exchange agent 120 by communication from the furnisher token controller 302 or by parsing the shielded exchange instruction 122.

The shielded exchange agent 120 may determine whether the new token nullifier 206 is present on the receiver blockchain 118 (506). For example, the shielded exchange agent 120 may access the receiver nullifier set 320 stored on the receiver blockchain 118. The receiver nullifier set 320 may include a plurality of hashed token identifiers stored on the receiver blockchain 118. The shielded exchange agent 120 may search the receiver nullifier set 320 for the new token nullifier 206. The shielded exchange agent 120 may determine whether the new token nullifier 206 is present in the receiver nullifier set 320.

In response to the new token nullifier 206 being included in the receiver nullifier set 320 (506, Yes), the shielded exchange agent 120 may obtain a new shielded exchange instruction 122 (502). For example, the shielded exchange agent 120 communicate, to the furnisher participant, a result message indicative of the hashed previous token identifier not being present in the nullifier set. The furnisher participants may regenerate the shielded exchange instruction 122 and recommunicate the shielded exchange instruction 122 to the shielded exchange agent 120. In other examples, the shielded exchange agent 120 may regenerate the shielded exchange instruction 122 by accessing the SEI generator 308 configured either locally or remotely.

In response to the new token nullifier 206 not being included in the receiver nullifier set 320, (506, No), the shielded exchange agent 120 may submit the shielded exchange instruction 122 to the furnisher smart contract 310 and/or the receiver smart contract 312 (508). In some examples, shielded exchange agent 120 may the permit, in response to determination that the new token nullifier 206 is not present in the nullifier set, submission of the shielded exchange instruction 122 to the furnisher smart contract 310 and/or the receiver smart contract 312. Alternatively or in addition, the shielded exchange agent 120 may restrict, in response to determination that hashed new token identifier is present in the receiver nullifier set 320, submission of the shielded exchange instruction 122 to the furnisher smart contract 310 and/or the receiver smart contract 312.

In some examples, the shielded exchange agent 120 may receive the shielded exchange instruction 122 from the furnisher DLT platform 110. In response to submission of the shielded exchange instruction 122 to the furnisher smart contract 310 and the receiver smart contract 312, the interoperability node 102 may communicate a submission result to the furnisher DLT platform 110. The furnisher DLT platform 110 may communicate a pre-hashed token identifier of the new token nullifier 206 to the receiver participant node 114 in response to determination that the shielded exchange instruction 122 was submitted to the furnisher smart contract 310 and/or the receiver smart contract 312.

Figure 6:
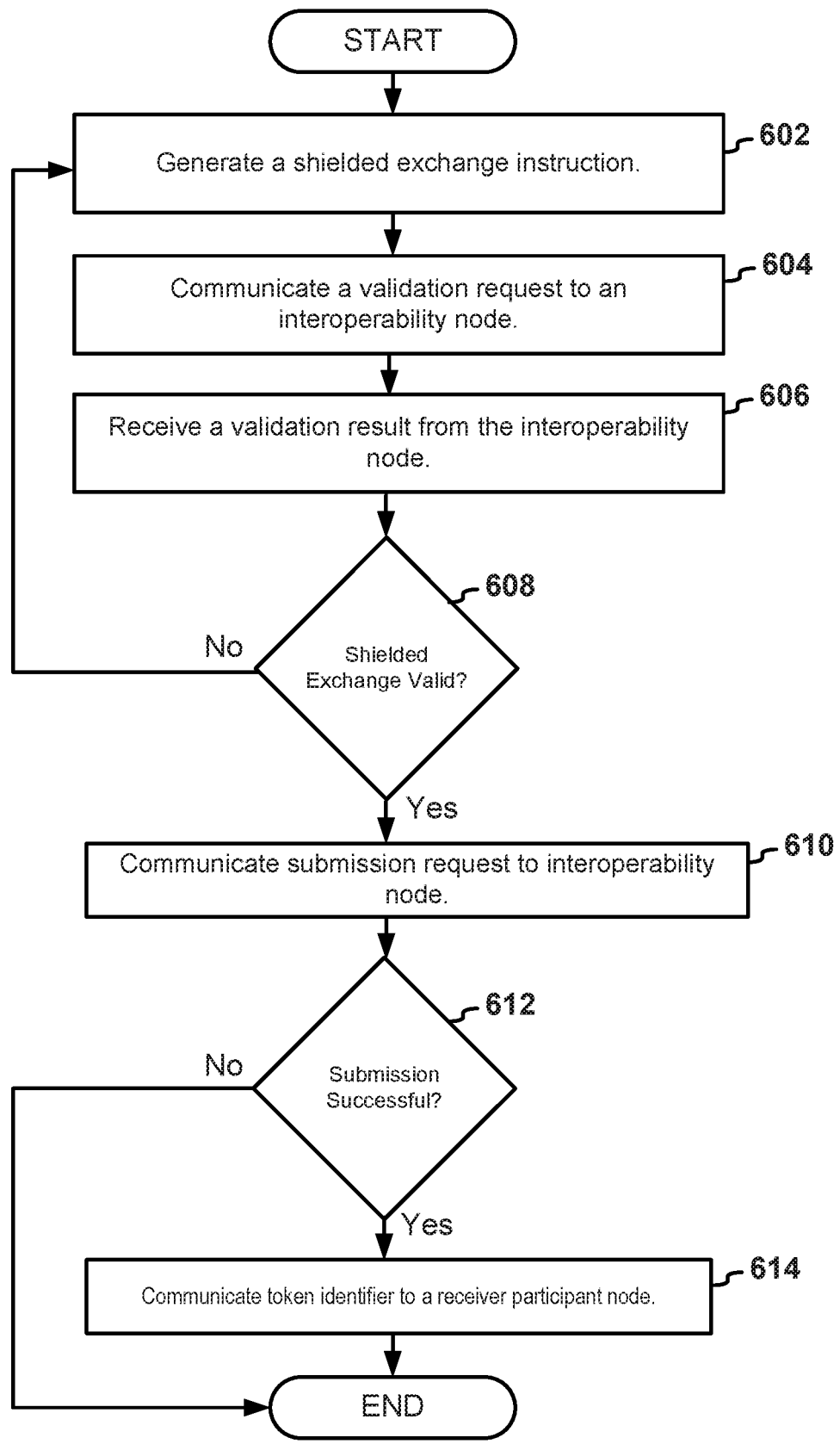
FIG. 6 illustrates a second flow diagram of example logic for a system.

FIG. 6 illustrates a second flow diagram of example logic for the system 100. The furnisher DLT platform 110 may generate a shielded exchange instruction 122 (602).

The furnisher DLT platform 110 may communicate a validation request to the shielded exchange agent 120 (604). The validation request may include the shielded exchange instruction 122, or components of the shielded exchange instruction 122. For example, the validation request may include the new token nullifier 206, the new change token nullifier, and/or the previous change token nullifier.

The furnisher DLT platform 110 may receive a validation result for the interoperability platform (606). The validation result may include a result that indicates at least one or more of the following: whether the new token nullifier 206 is included in the receiver nullifier set 320; whether the previous change nullifier 214 is included in the furnisher nullifier set 318; and whether the new change nullifier 212 is included in the furnisher nullifier set 318.

The furnisher DLT platform 110 may determine whether the shielded exchange instruction 122 is valid (608). Alternatively or in addition, the furnisher DLT platform 110 may determine whether components of the shielded exchange instruction 122 are valid. For example, the furnisher DLT platform 110 may determine, based on the validation response, whether the new token nullifier 206 is present in a receiver nullifier set 320 stored on the receiver blockchain 118. If the new token nullifier 206 is present in the receiver nullifier set 320, then the shielded exchange instruction may be invalid. Alternatively or in addition, the furnisher DLT platform 110 may determine, based on the validation response, whether the previous change token nullifier and/or the new change nullifier is present in the furnisher nullifier set 318 stored on the furnisher blockchain 112. If the previous token nullifier and/or the new change nullifier are present in the furnisher nullifier set, then the shielded exchange instruction may be invalid.

In response to determination that the shielded exchange result is invalid (608, no), the furnisher DLT platform 110 may generate a new shielded exchange instruction. For example, the furnisher DLT platform may re-generate a random number for the new token identifier, such that the hash value of the token identifier is not present in the receiver nullifier set 320 stored on the receiver blockchain 118. Alternatively or in addition, the furnisher DLT platform may re-generate a random number for the previous change identifier and/or the new change identifier such that the hash value for the previous change identifier and/or the hash value for the new change identifier are not present on the furnisher nullifier set 314.

In response to determination, based on the validation result, that the shielded exchange instruction 122 is valid (608, Yes) the furnisher DLT platform 110 may communicate a submission request to shielded exchange agent 120 (610). The submission request may include the shielded exchange instruction 122. In some examples, the receiver DLT platform 116 may have communicated an address of a receiver smart contract 312 to the furnisher DLT platform 110 off chain. The submission request may include address of the receiver smart contract 312 and/or an address of the furnisher smart contract 310 to the shielded exchange agent 120.

The furnisher DLT platform 110 determine whether the submission request successful (612). For example, the furnisher DLT platform 110 may receive, from the interoperability node 102, a submission result. The submission result may be indicative of successful or unsuccessful submission the shielded exchange instruction 122 to the furnisher DLT platform 110 and the receiver DLT platform 116.

In response to determination that the shielded exchange instruction 122 was successfully submitted to the furnisher smart contract 310 and/or the receiver smart contract 312 (612, Yes), the furnisher DLT platform 110 may communicate the new token identifier and/or a new token value to the receiver participant node 114 (614).

The system 100 may be implemented with additional, different, or fewer components than illustrated. Each component may include additional, different, or fewer components. Alternatively or in addition, the logic illustrated in the flow diagrams and sequence diagram may include additional, different, or fewer operations than illustrated. The operations illustrated may be performed in an order different than illustrated.

Figure 7:
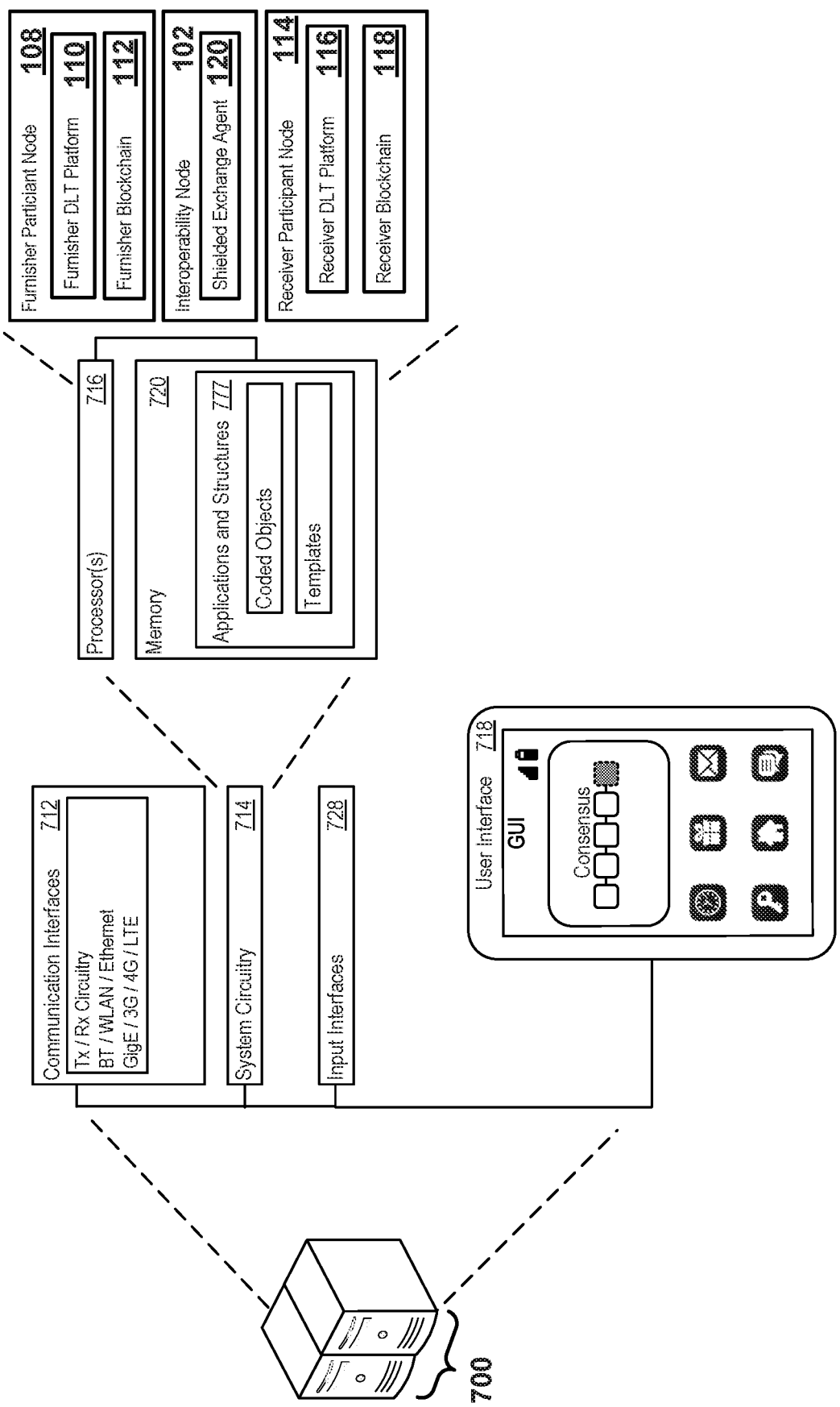
FIG. 7 illustrates an example of an execution environment for a system.

FIG. 7 illustrates an example of an execution environment 700 for the system 100. The execution environment 700 may serve as a hardware platform for the components of the system. The execution environment may include communication interfaces 712, input interfaces 728 and/or system circuitry 714.

The system circuitry may include a processor 716 or multiple processors. Alternatively or in addition, the system logic may include memory 720.

The processor 716 may be in communication with the memory 720. In one example, the processor 716 may also be in communication with additional elements, such as the communication interfaces 712 and/or the input interfaces 728. Examples of the processor 716 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 716 may be one or more devices operable to execute logic. The logic may include computer executable instructions or computer code stored in the memory 720 or in other non-transitory memory that when executed by the processor 702, cause the processor 716 to perform the features implemented by the logic of the furnisher participant node 108, the interoperability node 102, receiver participant node 114, the furnisher DLT platform 110, the furnisher blockchain 112, the shielded exchange agent 120, the receive DLT platform 116, and/or the receive blockchain 118 and/or the system 100. The computer code may include instructions executable by processor 716.

The memory 720 may be a device for storing and retrieving data or any combination thereof. The memory 720 may include non-volatile and/or volatile memory, such as a random access memory (RAM), a read-only memory (ROM), an erasable programmable read-only memory (EPROM), or flash memory. Alternatively or in addition, the memory 720 may include an optical, magnetic (hard-drive) or any other form of data storage device.

The memory 720 may include at least one of the furnisher participant node 108, the interoperability node 102, receiver participant node 114, the furnisher DLT platform 110, the furnisher blockchain 112, the shielded exchange agent 120, the receive DLT platform 116, the receive blockchain 118, and/or the system 100. In addition, the memory may include one or more other components or subcomponents previously discussed and/or other components of the system 100 described herein. Alternatively, the furnisher participant node 108, the interoperability node 102, and/or the receiver participant node 114 may reside in memory of other another execution environment hardware specific to the furnisher DLT network 104 or the receiver DLT network 106.

The system 100 may be implemented in many different ways. For example the components of the system 100 may be hardware or a combination of hardware and software. The components may include the furnisher participant node 108, the interoperability node 102, receiver participant node 114, the furnisher DLT platform 110, the furnisher blockchain 112, the shielded exchange agent 120, the receive DLT platform 116, the receive blockchain 118, the system 100, and/or other components and subcomponents of the system 100 described herein. For example, each component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 720, for example, that comprises instructions executable with the processor 716 or other processor to implement one or more of the features of the circuitry. When any one of the components includes the portion of the memory that comprises instructions executable with the processor 716, the component may or may not include the processor 716. In some examples, each component may just be the portion of the memory 720 or other physical memory that comprises instructions executable with the processor 716 or other processor to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

In various examples, the systems and methods described herein may relate to the following aspects:

1. A system, comprising:
    an interoperability node in communication with a furnisher participant node of a furnisher distributed ledger technology (DLT) network and a receiver participant node of a receiver DLT network, wherein a furnisher smart contract is stored on a furnisher blockchain for the furnisher DLT network and a receiver smart contract stored on a receiver blockchain for the receiver DLT network, the interoperability node comprising a processor configured to:
        obtain a shielded exchange instruction, the shielded exchange instruction comprising a zero-knowledge proof, a selected token nullifier, a new token nullifier, and a new token digest, wherein the selected token nullifier comprises a hash of a selected token identifier, the new token nullifier comprises a hash of a new token identifier, and the new token digest comprises a hash of at least a recipient public key of the receiver participant node and a new token identifier, wherein the zero-knowledge proof is indicative of the furnisher participant node having access to the selected token identifier;
        determine that the new token nullifier is not present on the receiver blockchain; and
        after determination that new token nullifier is not present in on the receiver blockchain, submit the shielded exchange instruction to the furnisher smart contract and the receiver smart contract, wherein the furnisher smart contract is configured to retire the selected token nullifier on the furnisher blockchain and the receiver smart contract is configured to insert the new token nullifier and the new token digest to the receiver blockchain.

2. The system of aspect 1, wherein to submit the shielded exchange instruction to the furnisher smart contract and the receiver smart contract, the processor of the interoperability node is further configured to:
    execute logic of the furnisher smart contract, where in the furnisher smart contract logic causes the processor of the interoperability node to retire the selected token nullifier on the furnisher blockchain; and
    execute logic of the receiver smart contract, wherein the receiver smart contract logic causes processor of the interoperability node to append the new token nullifier and the new token digest to the receiver blockchain.

3. The system of any of aspects 1 to 2, wherein to determine that the new token nullifier is not present on the receiver blockchain, the processor of the interoperability node is further configured to:
    access a nullifier set stored on the receiver blockchain, the nullifier set comprising a plurality of token nullifiers stored on the receiver blockchain, each of the token nullifiers;
    search the nullifier set for new token nullifier;
    determine that the new token nullifier is not present in the nullifier set; and
    communicate, to the furnisher participant node, a result message indicative of the new token nullifier not being present in the nullifier set.

4. The system of any of aspects 1 to 3, wherein the processor is further configured to:
    access a nullifier set stored on the receiver blockchain, the nullifier set comprising a plurality of token nullifiers stored on the receiver blockchain, each of the token nullifiers;

search the nullifier set for new token nullifier;
determine whether the new token nullifier is present in the nullifier set;
permit, in response to determination that the new token nullifier is not present in the nullifier set, submission of the shielded exchange instruction to the furnisher smart contract and the receiver smart contract; and
restrict, in response to determination that the new token nullifier is present in the nullifier set, submission of the shielded exchange instruction to the furnisher smart contract and the receiver smart contract.

5. The system of any of aspects 1 to 4, wherein the processor of the interoperability node is further configured to:
in response to submission of the shielded exchange instruction to the furnisher smart contract and the receiver smart contract, communicate a submission result to the furnisher participant node, wherein the furnisher participant node is configured to communicate the new token identifier corresponding to the new token nullifier to the receiver participant node in response to receipt of the submission result.

6. The system of any of aspects 1 to 5, wherein the zero-knowledge proof comprises a non-interactive zero-knowledge proof.

7. The system of any of aspects 1 to 6, wherein the zero-knowledge proof comprises a Zero-Knowledge Succinct Non-Interactive Argument of Knowledge (zk-SNARK).

8. A system comprising:
a furnisher participant node of a furnisher distributed ledger technology (DLT) network, the furnisher participant node in communication with an interoperability node for facilitating private token exchange between the furnisher participant node and a receiver participant node of a receiver DLT network, wherein a furnisher smart contract is stored on a furnisher blockchain for the furnisher DLT network and a receiver smart contract is stored on a receiver blockchain for the receiver DLT network, the furnisher participant node comprising a processor configured to:
generate a shielded exchange instruction, the shielded exchange instruction comprising a zero-knowledge proof, a selected token nullifier, a new token nullifier, and a new token digest, the selected token nullifier comprising a hash of a selected token identifier, the new token nullifier comprising a hash of a new token identifier, and the new token digest comprising a hash of at least a recipient public key and the new token identifier, wherein the zero-knowledge proof is indicative of the furnisher participant node having access to the selected token identifier;
communicate a validation request comprising the new token nullifier to the interoperability node;
determine, based on a validation response communicated by the interoperability node, that the new token nullifier is not present on the receiver blockchain;
in response to determination that the new token nullifier is not present on the on the receiver blockchain, communicate the shielded exchange instruction to the interoperability node, the interoperability node configured to submit the shielded exchange instruction to a furnisher smart contract configured on a furnisher DLT platform and a receiver smart contract configured on a receiver DLT platform;
receive, from the interoperability node, a submission result responsive to submission of the shielded exchange instruction to the furnisher smart contract and the receiver smart contract; and
communicate, in response to receipt of the submission result, the new token identifier to the receiver participant node.

9. The system of aspect 8, wherein the processor of the furnisher participant node is further configured to:
generate the new token identifier, the new token identifier comprising a random number; and
generating, based on a cryptographic hash function and the new token identifier, the new token nullifier.

10. The system of any of aspects 8 to 9, wherein the zero-knowledge proof comprises a non-interactive zero-knowledge proof.

11. The system of any of aspects 8 to 10, wherein the zero-knowledge proof comprises a Zero-Knowledge Succinct Non-Interactive Argument of Knowledge (zk-SNARK).

12. The system of any of aspects 8 to 11, wherein the processor of the furnisher participant node is configured to:
receive a submission request from the interoperability node, the submission request comprising the shielded exchange instruction;
in response to receipt of the submission request, execute the furnisher smart contract, the furnisher smart contract configured to cause the processor to:
access a nullifier set comprising a plurality of token nullifiers;
identify, in the nullifier set, the selected token nullifier; and
flag the selected token nullifier as retired.

13. The system of any of aspects 8 to 12, wherein the processor is further configured to:
deny a second submission request comprising a second shielded exchange instruction in response to second shielded exchange instruction including the selected token nullifier and the selected token nullifier being flag as retired.

14. The system of any of aspects 8 to 13, wherein to flag the selected token nullifier as retired, the processor of the furnisher participant node is further configured to:
append, to the furnisher blockchain, a datablock comprising an association between the selected token nullifier and a retirement flag.

15. A method, comprising:
obtaining a shielded exchange instruction communicated by a furnisher participant node of a furnisher distributed ledger technology (DLT) network, the shielded exchange instruction comprising a zero-knowledge proof, a selected token nullifier, a new token nullifier, and a new token digest, wherein the selected token nullifier comprises a hash of a selected token identifier, the new token nullifier comprises a hash of a new token identifier, and the new token digest comprises a hash of a new token identifier and a recipient public key, wherein the zero-knowledge proof is indicative of the furnisher participant node having access to the selected token identifier;
determining that the new token nullifier is not present on a receiver blockchain for a receiver DLT network; and
in response to determination that new token nullifier is not present in on the receiver blockchain:
submitting the shielded exchange instruction to a furnisher smart contract stored on a furnisher blockchain the furnisher smart contract is configured to retire the selected token nullifier on the furnisher blockchain, and submitting the shielded exchange instruction to a receiver smart contract stored on a receiver blockchain, the receiver smart contract to configured to append the new token nullifier and the new token digest to the receiver blockchain.

16. The method of aspect 15, wherein determining that the new token nullifier is not present on a receiver blockchain for a receiver DLT network, the method further comprising:
accessing a nullifier set stored on the receiver blockchain, the nullifier set comprising a plurality of token nullifiers stored on the receiver blockchain, each of the token nullifiers;
searching the nullifier set for new token nullifier;
determining that the new token nullifier is not present in the nullifier set; and
transmitting, to the furnisher participant node, a result message indicative of the new token nullifier not being present in the nullifier set.

17. The method of any of aspects 15 to 16, further comprising:
accessing a nullifier set stored on the receiver blockchain, the nullifier set comprising a plurality of token nullifiers stored on the receiver blockchain, each of the token nullifiers;
searching the nullifier set for new token nullifier;
determining whether the new token nullifier is present in the nullifier set;
permitting, in response to determination that the new token nullifier is not present in the nullifier set, submission of the shielded exchange instruction to the furnisher smart contract and the receiver smart contract; and
restricting, in response to determination that the new token nullifier is present in the nullifier set, submission of the shielded exchange instruction to the furnisher smart contract and the receiver smart contract.

18. The method of any of aspects 15 to 17, further comprising:
in response to submission of the shielded exchange instruction to the furnisher smart contract and submission of the shielded exchange instruction to the receiver smart contract, communicating a submission result to the furnisher participant node, wherein the furnisher participant node is configured to communicate the new token identifier corresponding to the new token nullifier to a receiver participant node of a receiver DLT network in response to receipt of the submission result.

19. The method of any of aspects 15 to 18, wherein the zero-knowledge proof comprises a non-interactive zero-knowledge proof.

20. The method of any of aspects 15 to 19, wherein the zero-knowledge proof comprises a Zero-Knowledge Succinct Non-Interactive Argument of Knowledge (zk-SNARK).

What is claimed is:

1. A system comprising:
a processor, the processor configured to:
receive a request to perform a token exchange between a first account and a second account, wherein a selected token for the token exchange is associated with the first account, wherein a hash of the selected token is stored on a furnisher blockchain of a first distributed ledger;
generate a new token and a hash of the new token;
generate a shielded exchange instruction, the shielded exchange instruction comprising the hash of the new token and a zero-knowledge proof, wherein the zero-knowledge proof is indicative of the selected token being associated with the first account;
submit the shielded exchange instruction to a distributed ledger technology platform to cause execution of a furnisher smart contract and a receiver smart contract, wherein the furnisher smart contract comprises instructions to verify the zero-knowledge proof and retire, on the furnisher blockchain, the hash of the selected token by flagging the hash of the selected token, and wherein the receiver smart contract comprises instructions to verify the zero-knowledge proof and insert, on a receiver blockchain of a second distributed ledger, the hash of the new token, wherein the first distributed ledger is different from the second distributed ledger; and
execute the instructions of the furnisher smart contract to retire the hash of the selected token, wherein execution of the instructions of the furnisher smart causes the processor to:
access a nullifier set comprising a plurality of hashed tokens;
identify, in the nullifier set, the hash of the selected token; and
flag the hash of the selected token as retired by appending, to the furnisher blockchain, a datablock comprising an association between the hash of the selected token and a retirement flag.

2. The system of claim 1, wherein the processor is further configured to:
transmit the new token to the second account after submission of the shielded exchange instruction to the furnisher smart contract and the receiver smart contract.

3. The system of claim 1, further comprising:
a memory, the memory storing the furnisher blockchain, the receiver blockchain, or any combination thereof.

4. The system of claim 1, wherein the processor is further configured to:
determine the hash of the new token is not stored on the receiver blockchain, wherein the processor is further configured to generate the shielded exchange instruction in response to determination that the hash of the new token is not stored on the receiver blockchain.

5. The system of claim 4, wherein to determine the hash of the new token is not stored on the receiver blockchain, the processor is further configured to:
access a nullifier set stored on the receiver blockchain, the nullifier set comprising a plurality of hashed tokens stored on the receiver blockchain;
search the nullifier set for the hash of the new token;
determine whether the hash of the new token is present in the nullifier set;
permit, in response to determination that the hash of the new token is not present in the nullifier set, submission of the shielded exchange instruction to the furnisher smart contract and the receiver smart contract; and
restrict, in response to determination that the hash of the new token is present in the nullifier set, submission of the shielded exchange instruction to the furnisher smart contract and the receiver smart contract.

6. The system of claim 1, wherein the zero-knowledge proof comprises a non-interactive zero-knowledge proof.

7. The system of claim 1, wherein the zero-knowledge proof comprises a Zero-Knowledge Succinct Non-Interactive Argument of Knowledge (zk-SNARK).

8. The system of claim 1, wherein the processor is further configured to:

execute the instructions of the receiver smart contract to append the hash of the new token to the receiver blockchain.

9. The system of claim 1, wherein the processor is further configured to:
deny a second request for a token exchange in response to the hash of the selected token being retired.

10. A method comprising:
receiving a request to perform a token exchange between a first account and a second account, wherein a selected token for the token exchange is associated with the first account, wherein a hash of the selected token is stored on a furnisher blockchain of a first distributed ledger;
generating a new token and a hash of the new token;
generating a shielded exchange instruction, the shielded exchange instruction comprising the hash of the new token and a zero-knowledge proof, wherein the zero-knowledge proof is indicative of the selected token being mapped to the first account;
submitting the shielded exchange instruction to a distributed ledger platform to cause execution of a furnisher smart contract and a receiver smart contract,
wherein the furnisher smart contract comprises instructions to verify the zero-knowledge proof and retire, on the furnisher blockchain, the hash of the selected token by flagging the hash of the selected token, and
wherein the receiver smart contract comprises instructions to verify the zero-knowledge proof and insert, on a receiver blockchain of a second distributed ledger, the hash of the new token, wherein the first distributed ledger is different from the second distributed ledger; and
executing the instructions of the furnisher smart contract by a furnisher participant node, an interoperability node, or any combination thereof, wherein executing the instructions of the furnisher smart contract comprises:
accessing a nullifier set comprising a plurality of hashed tokens;
identifying, in the nullifier set, the hash of the selected token; and
flagging the hash of the selected token as retired by appending, to the furnisher blockchain, a datablock comprising an association between the hash of the selected token and a retirement flag.

11. The method of claim 10, further comprising:
transmitting the new token to the second account after submission of the shielded exchange instruction to the furnisher smart contract and the receiver smart contract.

12. The method of claim 10, further comprising:
determining the hash of the new token is not stored on the receiver blockchain, wherein the shielded exchange instruction is generated in response to determination that the hash of the new token is not stored on the receiver blockchain.

13. The method of claim 12, wherein determining the hash of the new token is not stored on the receiver blockchain further comprises:
accessing a nullifier set stored on the receiver blockchain, the nullifier set comprising a plurality of hashed tokens stored on the receiver blockchain
searching the nullifier set for the hash of the new token;
determining whether the hash of the new token is present in the nullifier set;
permitting, in response to determination that the hash of the new token is not present in the nullifier set, submission of the shielded exchange instruction to the furnisher smart contract and the receiver smart contract; and
restricting, in response to determination that the hash of the new token is present in the nullifier set, submission of the shielded exchange instruction to the furnisher smart contract and the receiver smart contract.

14. The method of claim 10, wherein the zero-knowledge proof comprises a Zero-Knowledge Succinct Non-Interactive Argument of Knowledge (zk-SNARK).

15. The method of claim 10, further comprising
executing the instructions of the receiver smart contract by a receiver participant node, an interoperability node, or any combination thereof, wherein executing the instructions of the receiver smart contract further comprises appending the hash of the new token to the receiver blockchain.

16. The method of claim 10, further comprising:
denying a second request for a token exchange in response to the hash of the selected token being retired.

17. A non-transitory computer readable storage medium comprising:
a plurality of instructions executable by a processor, the instructions comprising:
instructions executable by a processor to receive a request to perform a token exchange between a first account and a second account, wherein a selected token for the token exchange is associated with the first account, wherein a hash of the selected token is stored on a furnisher blockchain of a first distributed ledger;
instructions executable by a processor to generate a new token and a hash of the new token;
instructions executable by a processor to generate a shielded exchange instruction, the shielded exchange instruction comprising the hash of the new token and a zero-knowledge proof, wherein the zero-knowledge proof is indicative of the selected token being associated with the first account;
instructions executable by a processor to submit the shielded exchange instruction to a distributed ledger technology platform, wherein the distributed ledger technology platform causes execution of a furnisher smart contract and a receiver smart contract,
wherein the furnisher smart contract comprises instructions to verify the zero-knowledge proof and retire, on the furnisher blockchain, the hash of the selected token by flagging the hash of the selected token, and
wherein the receiver smart contract comprises instructions to verify the zero-knowledge proof and insert, on a receiver blockchain of a second distributed ledger, the hash of the new token, wherein the first distributed ledger is different from the second distributed ledger; and
execute the instructions of the furnisher smart contract to retire the hash of the selected token, wherein execution of the instructions of the furnisher smart causes the processor to:
access a nullifier set comprising a plurality of hashed tokens;
identify, in the nullifier set, the hash of the selected token; and
flag the hash of the selected token as retired by appending, to the furnisher blockchain, a datablock comprising an association between the hash of the selected token and a retirement flag.

18. The medium of claim 17, wherein the zero-knowledge proof comprises a Zero-Knowledge Succinct Non-Interactive Argument of Knowledge (zk-SNARK).

19. The medium of claim 17, wherein the plurality of instructions further include instructions executable by a processor to:
   execute the instructions of the receiver smart contract to append the hash of the new token to the receiver blockchain.

20. The medium of claim 17, wherein the plurality of instructions further include instructions executable by a processor to:
   deny a second request for a token exchange in response to the hash of the selected token being retired.

\* \* \* \* \*